(12) United States Patent
Chernoff et al.

(10) Patent No.: US 9,154,451 B2
(45) Date of Patent: Oct. 6, 2015

(54) SYSTEMS AND METHODS FOR SHARING DEVICES IN A VIRTUALIZATION ENVIRONMENT

(75) Inventors: Anton Chernoff, Littleton, MA (US); Venkata S. Krishnan, Ashland, MA (US); Mark Hummel, Franklin, MA (US); David E. Mayhew, Northborough, MA (US); Michael J. Osborn, Hollis, NH (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 440 days.

(21) Appl. No.: 13/590,700

(22) Filed: Aug. 21, 2012

(65) Prior Publication Data

US 2014/0059160 A1  Feb. 27, 2014

(51) Int. Cl.
  *G06F 15/177* (2006.01)
  *H04L 12/931* (2013.01)
  *G06F 9/455* (2006.01)

(52) U.S. Cl.
  CPC ............ *H04L 49/70* (2013.01); *G06F 9/45558* (2013.01); *H04L 49/356* (2013.01); *G06F 2009/45579* (2013.01)

(58) Field of Classification Search
  CPC ............................... G06F 9/45533–2009/45595
  USPC .................. 709/213–216, 220–229; 718/100, 718/104–105
  See application file for complete search history.

(56) References Cited

U.S. PATENT DOCUMENTS

| | | | |
|---|---|---|---|
| 5,732,282 A * | 3/1998 | Provino et al. | 719/324 |
| 7,502,884 B1 | 3/2009 | Shah et al. | |
| 8,527,666 B2 * | 9/2013 | Brownlow et al. | 710/3 |
| 8,627,069 B2 * | 1/2014 | Clermont et al. | 713/164 |
| 2008/0162800 A1 * | 7/2008 | Takashige et al. | 711/104 |
| 2008/0307096 A1 * | 12/2008 | Wang et al. | 709/227 |
| 2009/0138887 A1 * | 5/2009 | Uehara et al. | 718/104 |
| 2012/0042095 A1 | 2/2012 | Kotha | |
| 2012/0102491 A1 | 4/2012 | Maharana | |
| 2012/0117301 A1 * | 5/2012 | Wingard | 711/6 |
| 2012/0151471 A1 * | 6/2012 | Brownlow et al. | 718/1 |
| 2014/0052877 A1 * | 2/2014 | Mao | 709/245 |

OTHER PUBLICATIONS

Mayhew et al.; Patent Application for "Devices and Methods for Interconnecting Server Nodes"; U.S. Appl. No. 13/526,973, filed Jun. 19, 2012.
David Mayhew; Patent Application for "Memory Switch for Interconnecting Server Nodes"; U.S. Appl. No. 13/529,452, filed Jun. 21, 2012.

(Continued)

*Primary Examiner* — Brendan Higa
(74) *Attorney, Agent, or Firm* — Park, Vaughan, Fleming & Dowler LLP (57) ABSTRACT

Described are systems and methods for communication between a plurality of electronic devices and an aggregation device. An aggregation device processes instructions related to a configuration of an electronic device in communication with the aggregation device. One or more virtual devices are generated in response to processing the instructions. The electronic device enumerates a configuration space to determine devices for use by the electronic device. The aggregation device detects an access of the configuration space by the electronic device. The one or more virtual devices are presented from the aggregation device to the electronic device in accordance with the instructions.

34 Claims, 7 Drawing Sheets

(56) References Cited

OTHER PUBLICATIONS

Hummel et al.; Patent Application for "Server Node Interconnect Devices and Methods"; U.S. Appl. No. 13/470,847, filed May 14, 2012.

Hummel et al.; Patent Application for "Systems and Methods for Input/Output Virtualization"; U.S. Appl. No. 13/531,890, filed Jun. 25, 2012.

International Search Report & Written Opinion in International Application No. PCT/US13/55086, mailed on Dec. 20, 2013; 12 pages.

* cited by examiner

SYSTEMS AND METHODS FOR SHARING DEVICES IN A VIRTUALIZATION ENVIRONMENT

FIELD OF THE INVENTION

The present invention relates generally to virtualized networks, and more specifically, to systems and methods for input/output (I/O) virtualization.

BACKGROUND

Data centers are generally centralized facilities that provide Internet and intranet services supporting businesses and organizations. A typical data center can house various types of electronic equipment, such as computers, domain name system (DNS) servers, network switches, routers, data storage devices, and so on. A given data center can have hundreds or thousands of interconnected server nodes communicating with each other and external devices via a switching architecture comprising the switches and routers. Conventional data centers can be configured for virtualization, permitting the server nodes to share network interface cards (NICs), hard disk drives, or other hardware.

BRIEF SUMMARY OF EMBODIMENTS

In accordance with embodiments of the inventive concepts, provided is an apparatus and method that includes an aggregation device that makes available to a server node an unbounded number of virtual devices of different types, e.g., vNICs, vHBAs, and so on, which are generated independently of, and unconstrained by, a particular physical device, e.g., NIC, HBA, and so on. For virtualized nodes, the aggregation device can create virtual devices for each VM and allow the VMs to use the network, for example, through what appears to the node to be one or more dedicated NICs. To provision a new device for a node, the aggregation device can monitor the communication channels between the aggregation device and any or all interconnected electronic devices, and determine when the node generates a request on its PCIe space, for example, a configuration space or a data space. The aggregation device provides a response, permitting the node to "discover" the requested virtual devices when it accesses its configuration space. The server node can process the virtual devices as though the virtual devices are physical devices for use by the node.

In one aspect, provided is a method for communication between a plurality of electronic devices and an aggregation device. At the aggregation device, instructions are provided that relate to a configuration of an electronic device in communication with the aggregation device. One or more virtual devices generate in response to processing the instructions. The electronic device enumerates a configuration space to determine devices for use by the electronic device. The aggregation device detects an access of the configuration space by the electronic device. The aggregation device presents to the electronic device, the one or more virtual devices in accordance with the instructions.

In another aspect, provided is a method for sharing physical devices in a virtualization environment. An electronic communication is established between an electronic device and an aggregation server. The aggregation server has a physical device; receiving a request at the aggregation server to provide the electronic device with access to a new device. A new range of addresses is detected at the electronic device. A virtual device is dynamically constructed at the aggregation server in response to the new range of addresses and arranging for the virtual device to at least one of transmit and receive data. An interrupt is sent to a processor at the electronic device. The processor discovers at the electronic device the virtual device as the new device.

In another aspect, provided is an apparatus. A virtual device generator generates one or more virtual devices for presentation to an electronic device of a plurality of electronic devices in communication with a configuration management system of the apparatus. A bus interface module monitors a communication channel between the electronic device and the apparatus for addresses intended for transmitting or receiving data between the electronic device and the configuration management system. A data processor establishes a communication with the generated one or more virtual devices for processing the data between the electronic device and the configuration management system.

In another aspect, provided is a computer program product comprising a computer readable storage medium having computer readable program code embodied therewith. The computer readable program code comprises computer readable program code configured to process, at an aggregation device, instructions related to a configuration of an electronic device in communication with the aggregation device; computer readable program code configured to generate one or more virtual devices in response to processing the instructions; computer readable program code configured to enumerate, by the electronic device, a configuration space to determine devices for use by the electronic device; computer readable program code configured to detect, by the aggregation device, an access of the configuration space by the electronic device; and computer readable program code configured to present, from the aggregation device to the electronic device, the one or more virtual devices in accordance with the instructions.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION OF EMBODIMENTS

In the following description, specific details are set forth although it should be appreciated by one of ordinary skill that the systems and methods can be practiced without at least some of the details. In some instances, known features or processes are not described in detail so as not to obscure the present invention.

Conventional I/O virtualization solutions can provide a finite number of virtualized devices, for example, virtual network interface cards (vNICs), virtual host bus adapters (vHBAs), or virtual basic input/output systems (vBIOSs). For example, a single-root input/output virtualization (SR-IOV) device or a multi-root input/output virtualization (MR-IOV) device allows a physical device such as a NIC to appear as multiple NICs to a host machine. Accordingly, multiple guests at a host machine can share a single PCI Express® (PCIe) device. This can be achieved by the host hypervisor mapping one or more virtual functions to a guest, where each virtual function can appear as a single port NIC to the host operating system. However, SR-IOV and MR-IOV are hardware-dependent, in that the number of virtualized instances, e.g., virtual functions, of a given hardware type, e.g., NIC, HBA, BIOS, is hardware-dependent, and therefore constrained by the implementation of corresponding hardware. For example, a NIC is limited by hardware constraints with respect to the number of virtual functions that it can support, for example, limited to 64 virtual functions per device.

The present inventive concepts provide an I/O aggregation device coupled to a plurality of host machines, for example, server nodes or related processor devices such as PCIe processor nodes, and makes available to each node an unbounded number of virtual devices of different types, e.g., vNICs, vHBAs, and so on, which are generated independently of, and unconstrained by, a particular physical device, e.g., NIC, HBA, and so on. The virtual devices can be created at boot time. Alternatively, the number and type of virtual devices accessible by the node can be dynamically provided at runtime to accommodate node resource or processing requirements. For example, a number of virtual NICs can be increased to address bottlenecks at a node. New virtual devices can be provisioned for a node under the direction of a management system connected to the aggregation device, or by a request from the node's CPU, hypervisor, or other program involved with processing data requiring peripheral devices and the like, such as NICs, BIOS, drivers, storage devices, terminals, or other PCIe-compliant devices.

To provision a new device for a node, the aggregation device can monitor the communication channels between the aggregation device and any or all interconnected electronic devices, and determine when the node generates a request on its PCIe space, for example, a configuration space or a data space. The aggregation device provides a response, permitting the node to "discover" the requested virtual devices when it accesses its configuration space. The node's CPU can generate data structures related to the virtual devices, and process the virtual devices as though the node interprets that the virtual devices are physical devices for use by the node. Due to the soft nature of the methods embodying certain aspects of the present inventive concepts, an unbounded number of virtual devices can be created at the aggregation device for any of the nodes connected to the aggregation device, preferably via PCIe communication channels.

In another embodiment, for virtualized processor nodes, i.e., nodes that are constructed and arranged to include a plurality of virtual machines (VM) having multiple guest operating systems, the aggregation device can create virtual devices for each VM and allow the VMs to use the network, for example, through what appears to the node to be one or more dedicated NICs. A hypervisor at the node is not required to intercept the guests' use of the virtualized devices, and the devices need not coordinate resources themselves, since the coordination is the responsibility of the virtual device software in the aggregation device.

During a data transfer operation, a node can process data using the virtual devices discovered during enumeration. The aggregation device can listen at a range of addresses spanning any or all server nodes having PCIe links with the aggregation device. After detecting a reference on a PCIe link to an address intended for the transmission of data, the aggregation device can emulate the physical device, for example, a network interface, intended to receive the data, and perform functions that the physical device would otherwise perform. For example, when a server node uses a virtual device to perform a data transfer or other I/O operation, the aggregation device can coordinate the handoff of the data from the server node to a physical device that can output the data to a network via a physical NIC or other device. To achieve this, read and write operations can be performed by the aggregation device to and from the node's local memory.

Figure 1:
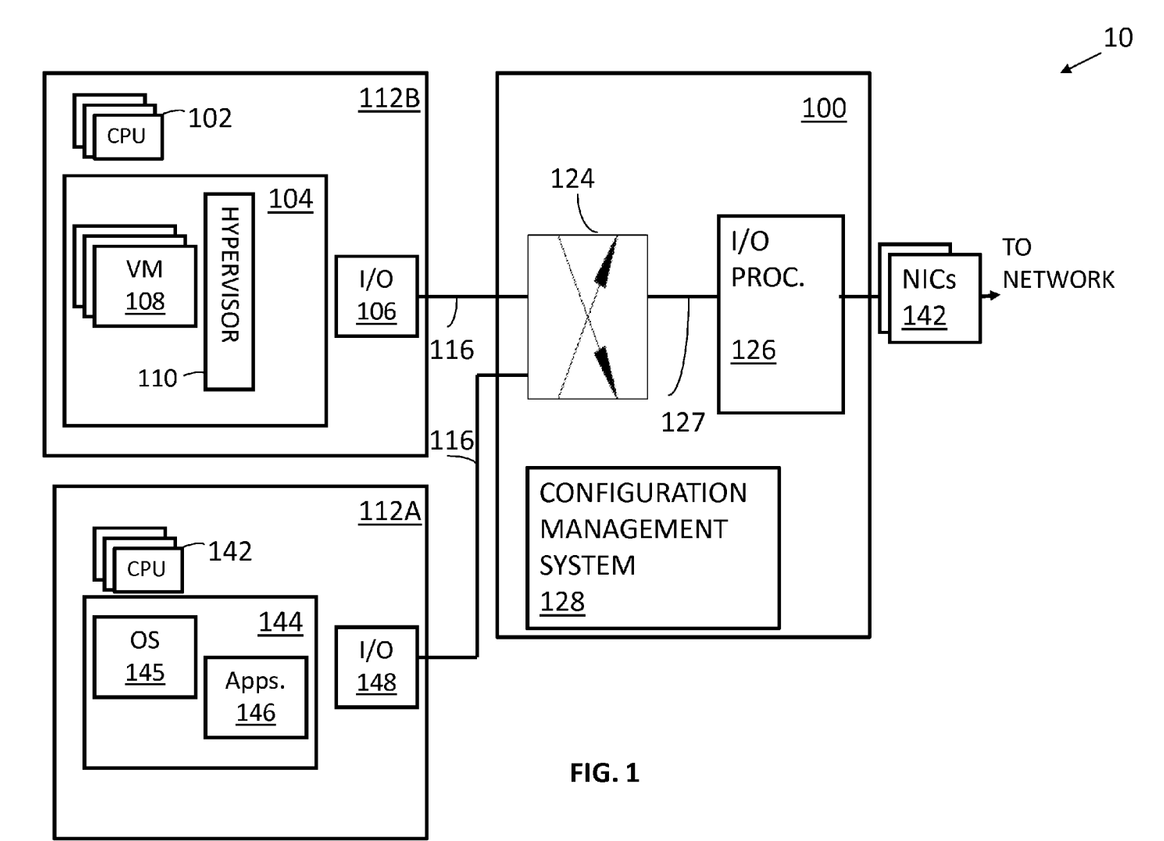
FIG. 1 is a diagram of a computing infrastructure, in which embodiments of the present inventive concepts can be practiced.

FIG. 1 is a diagram of a computing infrastructure 10, in which embodiments of the present inventive concepts can be practiced. In the computing infrastructure 10, a virtualized server node 112B and a non-virtualized server node 112A (generally, 112) are in communication with an aggregation system 100. The aggregation system 100 can communicate with the server nodes 112 via a plurality of ports. Each port can be an I/O port and can provide access to a node-centric PCIe configuration space.

The server nodes 112 can be microservers, single socket servers, PCIe processor nodes, or other low-power electronic devices. The server nodes 112 can be constructed and arranged as a processor cluster or other well-known arrangement.

The virtualized server node 112B includes a processor 102, which can include one or more microprocessors, central processing units (CPUs), graphics processing units (GPUs), digital signal processors (DSPs), application-specific integrated circuits (ASICs), memory controllers, multi-core processors, or other types of data processing devices, or portions and combinations of these and other devices.

The virtualized server node 112B also includes a memory 104 and an I/O logic 106. The memory 104 can be a non-volatile or volatile memory, for example, DRAM or static RAM (SRAM). Stored at the memory 104 can include an operating system, one or more applications, and/or other program code. The I/O logic 106 can be configured to include a southbridge or related I/O controller for managing data transfers between the server node 112 and the aggregation system 100, and for performing other computer I/O functions. The I/O logic 106 can include an Ethernet PCIe port or related network connector and software, for example, Ethernet device drivers, for establishing a communication channel 116 with the aggregation system 100. A communication channel 116 can include at least one PCIe link. Each PCIe link can comprise a plurality of PCIe lanes that form a channel with a server node 112.

In an embodiment, the memory 104 of the virtualized server node 112B includes one or more virtual machines 108, which share the one or more processors 102. Also stored in the memory 104 can include program code of an operating system, one or more applications, or other software programs executed by a processor 102.

The virtualized server node 112B can include a hypervisor 110. The hypervisor 110 can be configured to allow PCIe device functions and the like to be assigned to different VMs 108. In an embodiment, multiple virtualized server nodes 112B can share hardware, such as a NIC 142, or BIOS, HBA, or other hardware device via the aggregation system 100, and can therefore be constructed and arranged to include inexpensive, low-power components, achieved at least in part by eliminating expensive chips associated with NICs, BIOS, and the like.

The non-virtualized server node 112A includes a processor 142, a memory 144, and an I/O logic 148 that can be the same as or similar to counterpart elements of the virtualized server node 112B. Stored at the memory 144 can include an operating system 145, one or more applications 146, or other program code related to the performance of operations described herein.

The aggregation system 100 can include a switch fabric 124, an input/output (I/O) processor 126, and a configuration management system 128.

The switch fabric 124 provides a data plane interconnection between the server nodes 112, and includes a plurality of I/O ports (not shown) for exchanging data between the server nodes 112 and/or one or more remote electronic devices in communication with the aggregation system 100 via one or more NICs 142. The switch fabric 124 can include a switching configuration, for example, a crossbar, for moving data between the I/O ports. In another embodiment, the switch fabric 124 can include memory switch, for example, described at U.S. patent application Ser. No. 13/526,973 filed Jun. 19, 2012 entitled "Devices and Methods for Interconnecting Server Nodes" and U.S. patent application Ser. No. 13/529,452 filed Jun. 21, 2012 entitled "Memory Switch for Interconnecting Server Nodes," the contents of each of which is incorporated by reference herein in its entirety. The data can be provided in variable or fixed length data packets, cells, and the like, for exchanging between the input and output ports, and for facilitating communication between the server nodes 112 and/or shared physical devices such as a NIC 142, and/or external electronic devices in communication with the system 100 via the NIC 142.

The switch fabric 124 and the I/O processor 126 can be interconnected via an I/O communication channel 127, which provides bandwidth for exchanging data between output ports at the switch fabric 124 and the I/O processor 126. The I/O processor 126 processes data transferred between the aggregation system 100 and the server nodes 112 and/or remote computing devices. The I/O processor 126 can examine incoming data packets and the like directed to a server node 112, and/or external computing devices via the NICs 142, and can route the data packets and the like to their destination, or output data packets to a remote device, for example, via the NIC 142, based on destination address information or other identification fields. The I/O processor 126 can include a packet processor that examines data packets to determine whether they should be filtered or forwarded.

The configuration management system 128 can receive and process instructions related to a configuration of one or more server nodes 112, for example, instructions on a type and number of virtual devices a server node can receive for enumeration, and generate the virtual devices in accordance with the instructions. Virtual devices generated at the configuration management system 128 can be used by the server nodes 112 for performing data transfer operations or related operations.

Figure 2:
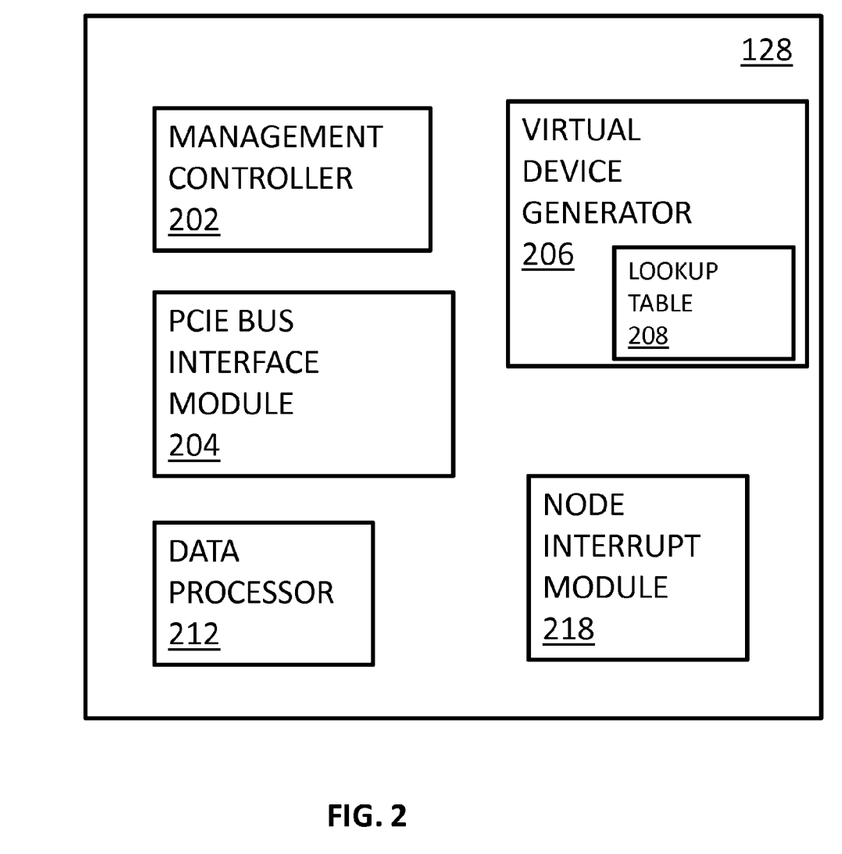
FIG. 2 is a block diagram of the configuration management system of FIG. 1, in accordance with an embodiment.

FIG. 2 is a block diagram of the configuration management system 128 of FIG. 1, in accordance with an embodiment.

The configuration management system 128 can include a management controller 202, a PCIe bus interface module 204, a virtual device generator 206, a data processor 212, and a node interrupt module 218.

The management controller 202 can receive instructions related to a node configuration from a source such as a network management system, a human operator, a data repository, or related computer having instruction data. A physical console or other configuration data source (not shown) can be coupled to the configuration management system 128 via an Ethernet connection (not shown) and the like for providing configuration information to the management controller 202. For example, a management console can be used to indicate how many NICs or other devices to provision for one or more electronic devices. In another embodiment, the management controller 202 includes one or more default configurations, whereby instructions and/or other configuration information are provided that define aspects of the configurations. Default or remotely provided configuration data can establish a maximum, minimum, and/or predetermined number of virtual devices for enumeration and processing by a server node 112. For example, the management controller 202 can receive an instruction from a controller or from the server node 112 that a predetermined number of NIC devices, for example, two NICs, are required for a given server node processor or virtual machine. In this example, the management controller 202 can process data including a requirement establishing that a server node processor, in accessing its configuration space related to an enumeration operation, can discover the two requested NICs, which in fact are two virtual devices provided by the configuration management system 128 that can emulate the desired NICs. Alternatively, instructions and/or configuration information can be provided to the management controller 202 via a virtual machine 108, more specifically, output by a hypervisor 110 communication with the management controller 202 via a PCIe connection. The management controller 202 can communicate with the virtual device generator 206, the data processor 212, and/or other elements of the aggregation system 100 to process received instructions.

The PCIe bus interface module 204 listens for PCIe configuration space accesses made by the server nodes 112 related to an enumeration operation. Accordingly, the PCIe bus interface module 204 can detect a reference to an address corresponding to the device intended for a transmission or receipt of data. Since the aggregation system 100 can be coupled to numerous server nodes 112 via PCIe connections, the PCIe bus interface module 204 can monitor all communication channels 116 for a reference to accesses related to particular addresses among a vast range of PCIe addresses, to identify server nodes 112 performing PCIe accesses to a configuration space. The configuration management system 128 can include a PCI bus interface module 204 for each PCIe port, or for multiple PCIe ports.

The virtual device generator 206 can generate a plurality of virtual devices that can be processed by the non-virtualized server node 112A and/or the non-virtualized server node 112B during an enumeration operation. The virtual device information presented for enumeration can be provided accordance with instructions processed by the management controller 202 or a default configuration, for example, an instruction that provides a maximum number of "devices" provided to a server node 112 for enumeration.

The virtual device generator 206 includes a lookup table 208 that can be configured to include a plurality of entries corresponding to the generated virtual devices. Each entry can include a bus address, for example, a PCIe address, and data for mapping the address and a generated virtual device that the server node 112 can discover during enumeration, and dynamically allocate resources to. For example, each PCIe address or range of addresses can correspond to a virtual NIC that can be used by the server node 112 after the server node 112 performs a runtime search of its PCIe configuration space and generates the appropriate data structures after detecting the virtual NICs, subject to constraints provided by the management controller 202 and/or the server node 112. The number of virtual devices generated for one or more server nodes 112 is not dependent on the physical device emulated by the virtual devices, since the "devices" presented to the server node 112 for enumeration are entries at the lookup table 208.

The configuration management system 128 can populate the table 208 with entries in accordance with received instructions. Alternatively, the table 208 can include entries that include default configuration information. Each entry can provide data describing a requested "device" to be emulated. These data can be presented to the processor or virtual entity when it enumerates devices. Thus, when the processor or virtual entity accesses its configuration space, it will see during enumeration the number of requested devices according to the table entries.

The data processor 212 processes data provided by a server node 112 via the virtual devices provided to the server nodes 112. When a server node 112 outputs data using an assigned virtual device, the data processor 212 can access the table 208 to determine a destination for the data, for example, a physical device, e.g., NIC 142. This can be achieved by the data processor 212 mapping a PCIe address corresponding to an outbound virtual device used by the sending server node 112 for outputting the data. When data is received by the aggregation system 100 for a destination server node 112, the data processor 212 can determine from the table 208 the inbound virtual device at the destination server node 112 for receiving the data. The data processor 212 can determine from the PCIe bus interface module 204 that the data is being written to or read from a PCIe address corresponding to a generated virtual device that is identified as an entry at the table 208.

The node interrupt module 218 can interrupt a server node 112 to inform the server node 112 of a new "device", which in fact is a virtual device in the table 208. The server node 112 can "discover" the new device during an enumeration operation performed at the server node's PCIe configuration space.

Figure 3:
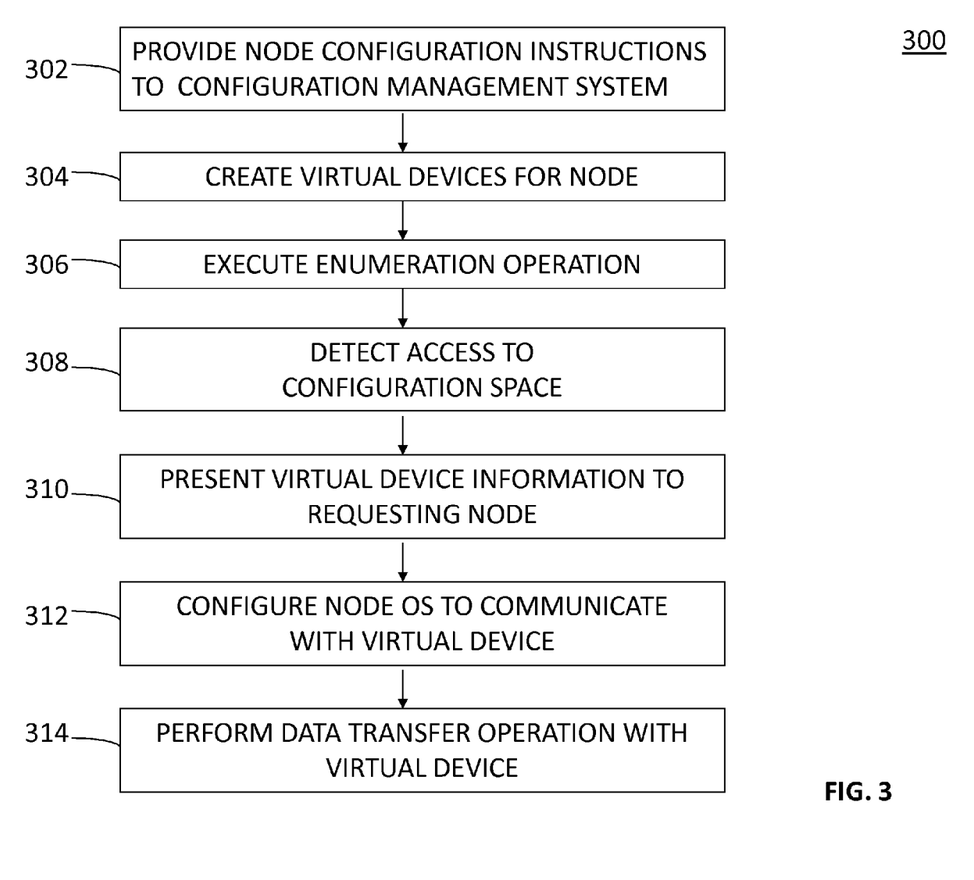
FIG. 3 is a flow diagram illustrating a method for generating an unbounded number of virtual devices for a set of interconnected server nodes, in accordance with an embodiment.

FIG. 3 is a flow diagram illustrating a method 300 for generating a plurality of virtual devices for availability to a connected system of nodes, in accordance with an embodiment. In describing the method 300, reference is made to FIGS. 1 and 2. Some or all of the method 300 can be performed at the configuration management system 128, one or more server nodes 112, or a combination thereof.

At block 302, node configuration instructions are provided to the configuration management system 128. A network or other user can enter the instructions to a computer connected to the management controller 202. Alternatively, the instructions can be provided by the server node 112, for example, a hypervisor 110 at the server node 112. Accordingly, the configuration management system 128 can receive instructions regarding a number and/or type of virtual devices for the server node 112 to process during an enumeration operation. The generated virtual devices can appear as PCIe devices to a server node 112, for example, a physical NIC. Alternatively, the generated virtual devices can appear as vNICs and the like to a server node 112 configured to include virtual machines 108, a hypervisor 110, a virtual switch (not shown), and the like. Here, virtual devices can be generated by the configuration management system 128 for each virtual machine 108. A guest OS running on a virtual machine 108 in executing an enumeration operation can be intercepted by the hypervisor 110, which provides a plausible fiction of what is available for devices, i.e., virtual devices by the configuration management system 128 for the guest OS to use.

At block 304, the configuration management system 128 can create a set of virtual devices in response to the node configuration instructions, or according to preconfigured rules provided by the rules engine 210, or based on other configuration instructions. The table 208 at the virtual device generator 206 can be populated with data related to the virtual devices, for example, the type of virtual device. The table 208 can include PCIe addresses for mapping to the virtual devices.

At block 306, the server node 112 executes an enumeration operation, for example, to enumerate existing devices. The enumeration operation can include a runtime search through the configuration space to discover the devices to be processed by the server node 112.

At block 308, the PCIe bus interface module 204 listens to all PCIe accesses made by server nodes 112 coupled to the aggregation system 100. Accordingly, the PCIe bus interface module 204 can detect a request from the server node 112 during an enumeration operation, when accessing its configuration space.

At block 310, the data processor 212 can provide a response to the enumeration operation by presenting information related to the created virtual devices to the server node 112. The information can be provided in accordance with the instructions and/or default configuration information, for example, establishing that when the requesting server node 112 looks at its configuration space, it will "discover" a predetermined number and type of devices. The information can be presented to the requesting server node 112 in a manner that appears as physical devices and/or virtual devices, depending on the requirements and capabilities of the server node 112. The information can include addresses where the control and/or status registers related to the created virtual devices can be accessed, permitting the server node 112 to communicate with the virtual devices using these addresses on the PCIe bus 116 as though they are "real" devices.

At block 312, the operating system of the server node 112 can be configured to communicate with the virtual devices, for example, by creating data structures using the information provided at block 310. Accordingly, at block 314, data is exchanged between the server node 112 and the aggregation system 100, which the server node 112 is configured to believe is a PCIe device, when in fact the aggregation system 100 is emulating a PCIe device. The data can include control-related information, and or response data. The data can include payload data. The virtualized server node 112B can run a hypervisor that provides the virtual devices to one or more guests. A non-virtualized server node 112A can use the virtual devices as though they are physical devices, for example, Ethernet ports.

Figure 4:
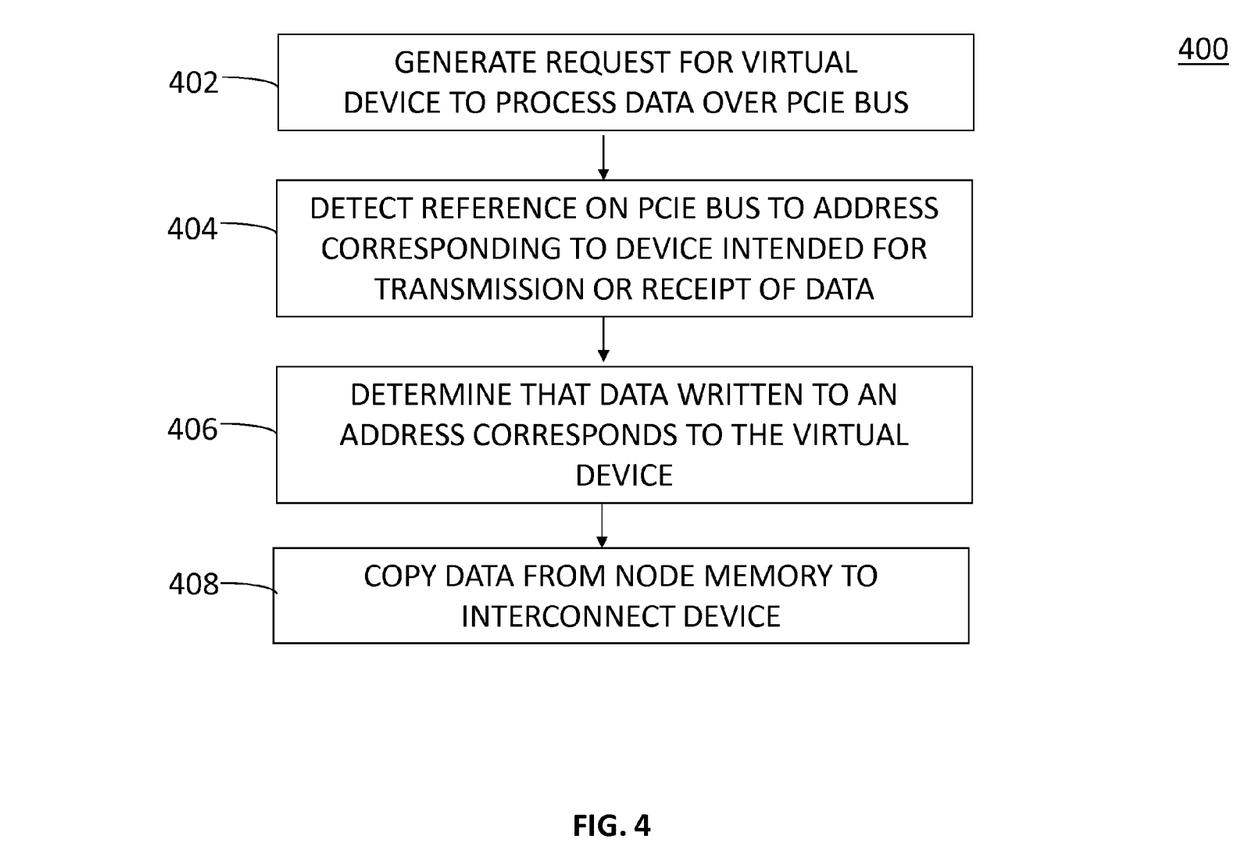
FIG. 4 is a flow diagram illustrating a method for performing a data transfer operation, in accordance with an embodiment.

FIG. 4 is a flow diagram illustrating a method 400 for performing a data transfer operation, in accordance with an embodiment. In describing the method 400, reference is made to FIGS. 1-3. The server node 112 can be constructed and arranged to exchange data with the virtual devices presented to a server node 112 in accordance with the method 400.

At block 402, a request is made at the server node 112 over a bus 116, for example, a PCIe bus, for the virtual device to process the data. For example, a CPU, virtual machine, or other processing element of the server node 112 can send a request, for example, an Ethernet request, on the PCIe bus 116 using control and status registers provided during the enumeration operation. Control information and/or other data related to a PCIe address of a range of addresses corresponding to the virtual device can be output on the PCIe bus 116 to the aggregation system 200.

The PCIe bus interface module 204 can monitor the PCIe bus 116 for a range of addresses corresponding to the control and status registers of the virtual devices assigned to the server node 112. At block 404, the PCIe bus interface module 204 can detect reference to an address of the PCIe address range corresponding to the device that the server node 112 intends to send data, or receive data.

At block 406, the data processor 212 can access the lookup table 208 to determine, for example, at the data processor 212, that the data is being written to a PCIe address corresponding to a virtual device assigned to the requesting server node 112. The data processor 212 can access the lookup table 208 to determine the manner in which to process the data received from the server node 112. s described above, the actual responder to the request is not a physical device, but is instead a software module designated by the entry at the lookup table 208 representing the "device" presented to the server node 112 during enumeration.

At block 408, the data processor 212 can copy data from the server node 112 to a buffer (not shown) at the aggregation system 100. This can be achieved by outputting descriptors, interrupts, or other related data during the data transfer. The aggregation system 100 can subsequently process the data via the virtual device, which can perform the functions of an actual NIC, such as exchanging descriptors with buffers at the server node 112, or performing routing-related functions such as extracting header information from the data, transmitting the data over the switch fabric 124 to another server node 112, or an external device via the I/O processor 126, and so on.

Figure 5:
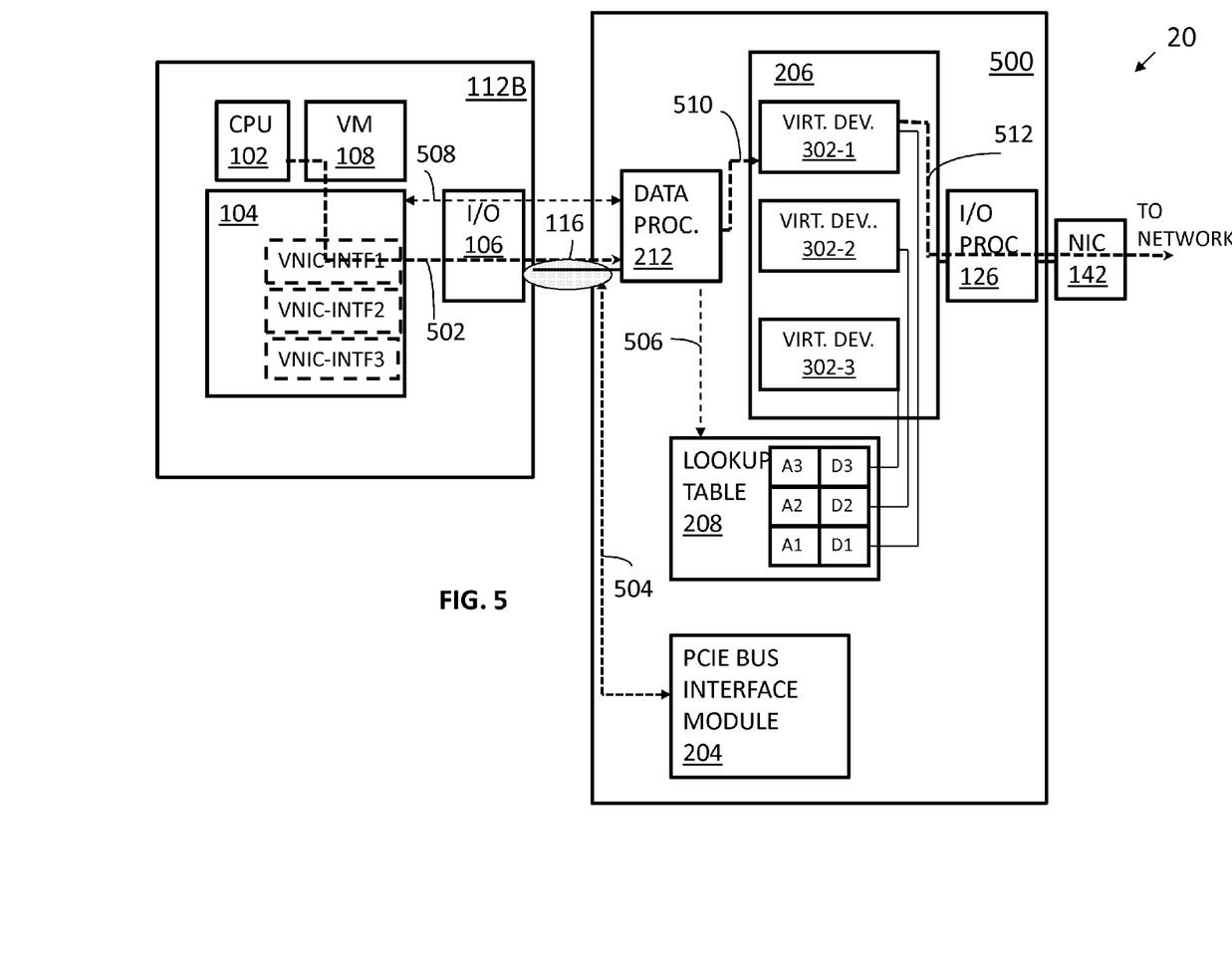
FIG. 5 is an illustration of data flow paths between various elements of a computing infrastructure during a data transfer operation, in accordance with another embodiment.

FIG. 5 is an illustration of data flow paths between various elements of a computing infrastructure 20 during a data transfer operation, in accordance with another embodiment. Prior to the data transfer operation, the method 300 described at FIG. 3 can be executed. In performing an enumeration step of method 300, a virtualized server node 112B can perform a data transfer operation at one or more virtual devices 302-1, 302-2, 302-3 (generally, 302) at an aggregation system 500. In FIG. 5, the server node 112B after performing an enumeration operation can output data via one or more of the three virtual devices 302 presented by the aggregation system 500. In other embodiments, any number of virtual devices can be generated. In other embodiments, a non-virtualized server node can be connected to the aggregation system 500 and can process virtual devices presented by the aggregation system 500 during enumeration. In other embodiments, data can be exchanged between the server node 112B and remote devices in the communication with the aggregation system 500 via a NIC 142. In other embodiments, the NIC 142 is not required for communications between server node 112B and other devices in direct or indirect communication with the aggregation system 500, for example, another server node 112.

The server node 112B generates a request 502 that is output to the aggregation system 500 for the designated virtual device 302-1 to process data designated for a destination device, for example, another server node connected to the aggregation system 500, or a remote device via a NIC 142 connected to the aggregation system 500. The CPU 102 of the server node 112B can build control and/or data information, then output a request out on the PCIe bus 116. In an embodiment, the request is an Ethernet request.

The PCIe bus interface module 204 detects a communication 504 at a range of PCIe addresses assigned to the server node 112B, more specifically, a PCIe address among the range of PCIe addresses that corresponds to the designated virtual device 302-1 generated at the virtual device generator 206, and intended for transmitting the server node data to a destination.

The data processor 212 can access 506 the lookup table 208 for mapping information related to the detected PCIe address and an outbound virtual device that the server node 112B believes is outputting the data sent from the server node 112B to the aggregation system 300. For example, a first entry in the table 208 can include data D1 related to a virtual device 302-1 and a corresponding PCIe address A1. A second entry can include data D2 related to a virtual device 302-2 and a corresponding PCIe address A2. A third entry can include data D3 related to a virtual device 302-2 and a corresponding PCIe address A3. A comparison can be made between the PCIe address and a corresponding entry at the lookup table 208 to determine if the virtual device for which the data received from the server node 112B is processed.

A request is sent to the aggregation system 500, which then proceeds to directly access the memory on the server node 112B to transfer the data. The request can contain the type of transfer, remote node address, and address/size of the data within the server node 112B virtual memory. The CPU 102 of the server node 112B can communicate with the assigned virtual device, for example, virtual device 302-1, which is believed by the server node 112B to be a PCIe device. The virtual device 302-1 can exchange descriptors with the server node 112B or perform related operations related to the exchange of data. The data processor 212 can directly access 508 the data for transmission from the server node 112B. The data is accessed after the descriptors are exchanged. Accordingly, the virtual device 302-1, which is generated from the data A1, D1 at the lookup table, receives 510 the data from the server node 112B, and outputs 512 the data to its destination, in this example, a device via a NIC 142. In another example, the data can be output to a destination server node (not shown) coupled to the aggregation system 500. Here, the virtual device 302-1 can transfer the data to the receiving server node, send an interrupt, and so on.

Figure 6:
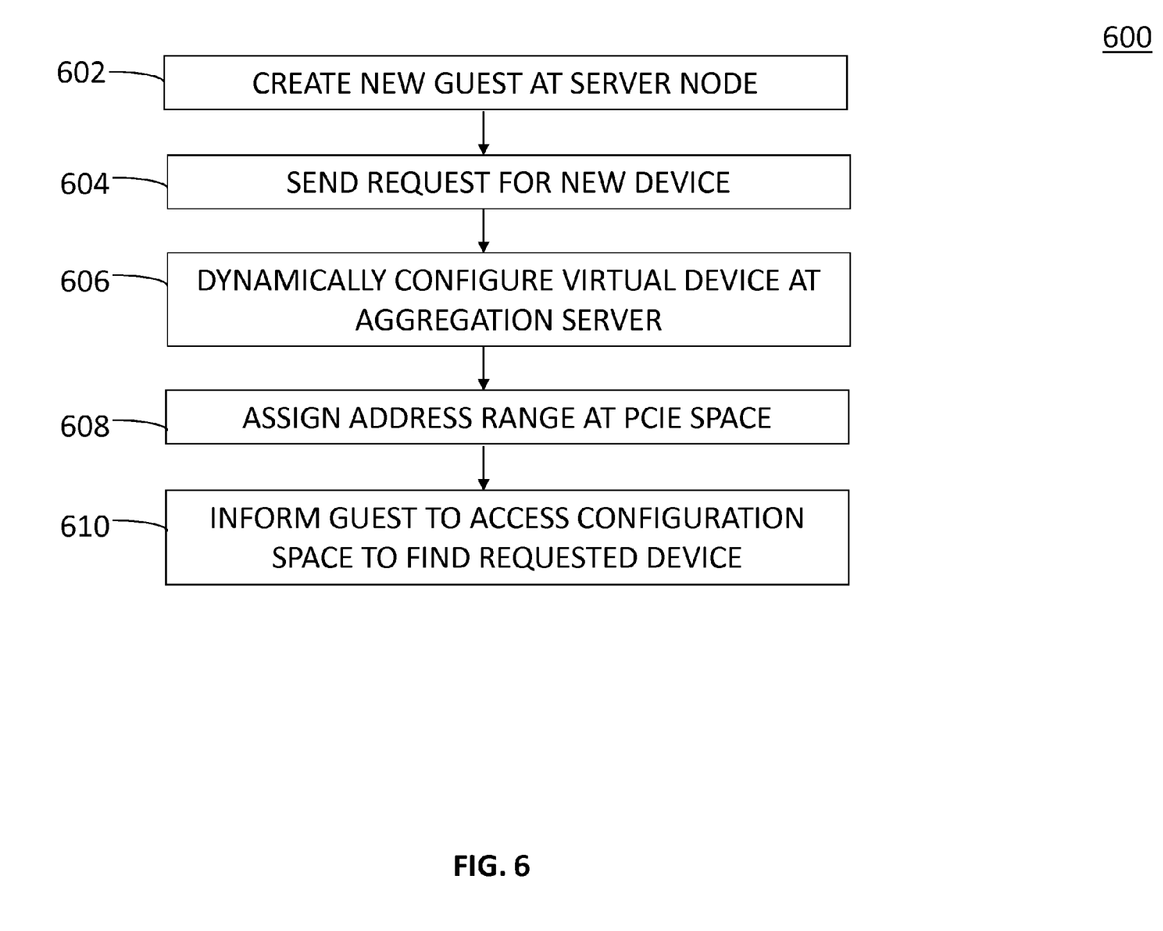
FIG. 6 is a method for dynamically generating a virtual device for a server node, in accordance with an embodiment.

FIG. 6 is a method 600 for generating an unbounded number of virtualized devices for a server node, in accordance with an embodiment. In describing the method 600, reference is made to FIGS. 1-5.

At block 602, a new virtual machine guest is created at a virtualized server node 112B. The new guest can be created according to virtualization techniques known to those of ordinary skill in the art.

At block 604, the server node 112B generates a request for a new device. For example, the hypervisor 110 may send a request to the aggregation system 100 that a virtual NIC is to be provided for the new guest.

At block 606, the configuration management system 128 can dynamically configure a virtual device for the new guest. An entry can be created at the lookup table 208 that identifies the new virtual device.

At block 608, the configuration management system 128 can assign a PCIe address range at the PCIe space of the server node 132. The configuration management system 128 can also provide mapping information between a PCIE address and the virtual device, a pointer to a physical device, or/and information related to the generated virtual device.

At block 610, the guest is informed to access the node configuration space for the requested virtual device. Accordingly, the method 600 permits virtual devices to be created for each virtual machine at one or more server nodes, and to allow the virtual machines to use a network, for example, through a plurality of virtual devices that appear to the virtual machines as one or more dedicated NICs or other hardware devices. The hypervisor 110 is not required to receive the virtual devices, and need not intercept the guests' use of their virtual devices. Instead, the aggregation system 100 coordinates the various resources required to process data to and from the virtual devices.

Figure 7:
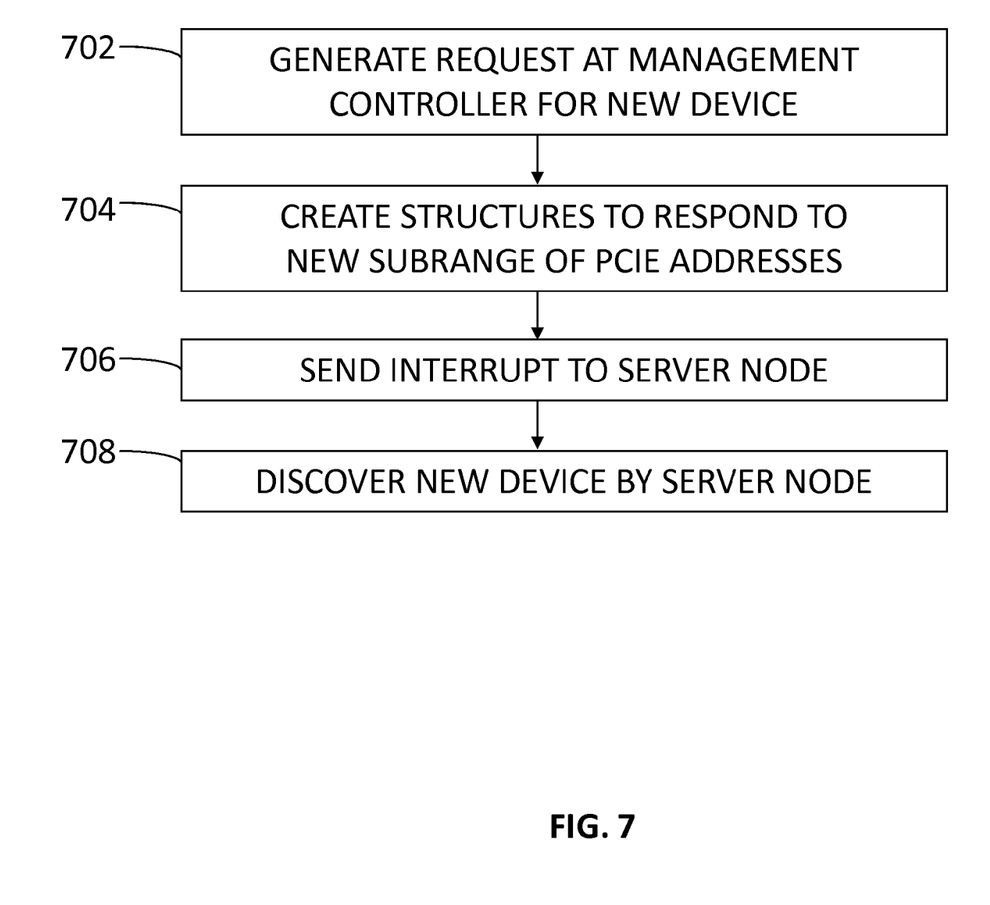
FIG. 7 is a method for modifying a number of virtual devices available to a server node in an operation, in accordance with an embodiment.

FIG. 7 is a method 700 for modifying a number of virtual devices available to a server node in an operation, in accordance with an embodiment. In describing the method 700, reference can be made to elements of FIGS. 1-6.

In accordance with an embodiment, the configuration management system 128 can dynamically modify a pool of available resources for a server node 112 according to changing requirements of the server node 112. For example, an operator such as a network manager and/or a network management system can determine that a server node 112 is experiencing congestion at its I/O ports, and that additional physical or virtual devices are required to alleviate the congestion. A determination can be made that that the congestion can be reduced or eliminated by adding a device that is recognized by the server node 112 as a NIC or other device, but is actually a virtual device generated at the aggregation system 100.

At block 702, the management controller 202 can generate a request for a new NIC for the server node 112, more specifically, a virtual device that emulates a NIC, or other device such as a DMA device, terminals, storage device, or other PCIe device. The management controller 202 can generate the request in response to a request or instructions provided by the server node 112, or by the network management system.

At block 704, the virtual device generator 206 creates the structures for responding to the subrange of PCIe addresses corresponding to the server node 112. In doing so, an entry is generated for the lookup table 208 to include data for mapping the PCIe address to the new virtual device.

At block 706, the node interrupt module 718 can generate an interrupt that is output to the server node 112 to inform the server node 112 of the new virtual device according to the table entry contents. At block 708, the server node 112 can discover the new device during an enumeration operation performed at the server node's PCIe configuration space.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific embodiments, it should be understood by those skilled in the art that various changes in form and detail may be made therein without departing from the spirit and scope of the invention.

What is claimed is:

1. A method for communication between a plurality of electronic devices and an aggregation device, the method comprising:
    processing, at the aggregation device, instructions related to a configuration of an electronic device in communication with the aggregation device;
    generating one or more virtual devices in response to processing the instructions;
    enumerating, by the electronic device, a configuration space to determine devices for use by the electronic device;
    detecting, by the aggregation device, an access of the configuration space by the electronic device; and
    presenting, from the aggregation device to the electronic device, the one or more virtual devices in accordance with the instructions.

2. The method of claim 1, further comprising:
    performing a data transfer operation between the electronic device and the one or more virtual devices at the aggregation device.

3. The method of claim 2, wherein the data transfer operation includes the exchange of command and response information between the electronic device and the aggregation device.

4. The method of claim 2, wherein performing the data transfer operation includes:
    detecting, by the aggregation device, a reference to an address, the address corresponding to a generated virtual device of the one or more virtual devices;
    determining that the data in the data transfer operation is a command intended related to a transmission of data or a response related to a receipt of data by the virtual device;
    determining, in response to detecting the reference to the address, that the data is written to or read from the address; and
    processing an operation related to the data written to or read from the address at the virtual device.

5. The method of claim 1, further comprising:
    generating, at the electronic device, a request for a virtual device of the one or more virtual devices to provide data to a destination via the aggregation device;
    intercepting the request at the aggregation device;
    copying the data from the electronic device to the aggregation device; and
    processing the data by the virtual device at the aggregation device.

6. The method of claim 1, wherein the one or more virtual devices include a virtual network interface card (NIC), a virtual host bus adapter (vHBA), a virtual basic input/output system (vBIOS), or a combination thereof.

7. The method of claim 1, further comprising:
    monitoring, by the aggregation device, all communication channels with the plurality of electronic devices for a plurality of ranges of addresses assigned to the plurality of electronic devices.

8. The method of claim 7, wherein the range of addresses includes a subset of addresses corresponding to the electronic device of the plurality of electronic devices.

9. The method of claim 7, wherein performing the data transfer operation comprises:
    detecting, by the aggregation device at a bus between the electronic device and the aggregation device, a request at an address of the subset of addresses, the request directed at a virtual device of the one or more virtual devices intended for transmitting command data to the electronic device.

10. The method of claim 1, further comprising listening for PCIe accesses to a configuration space at the electronic device to determine whether a request is generated for new devices.

11. The method of claim 1, wherein sending the request for available devices from the electronic device to the aggregation device comprises generating the request at a hypervisor at the electronic device.

12. The method of claim 1, further comprising:
    providing, by a configuration data source in communication with the aggregation device, the instructions.

13. The method of claim 1, further comprising:
    providing, by a communication from a management console to the aggregation device, instructions on a number and type of virtual devices that are to be created for use by the electronic device of the plurality of electronic devices.

14. The method of claim 1, further comprising:
    providing, by a default configuration within the aggregation device, instructions on a number and type of virtual devices that are to be created for use by the electronic device of plurality of electronic devices.

15. A method for sharing physical devices in a virtualization environment, comprising:
    establishing an electronic communication between an electronic device and an aggregation server, the aggregation server having a physical device;
    receiving a request at the aggregation server to provide the electronic device with access to a new device;
    detecting a new range of addresses at the electronic device;
    dynamically constructing a virtual device at the aggregation server in response to the new range of addresses and arranging for the virtual device to at least one of transmit and receive data;

sending an interrupt to a processor at the electronic device; and discovering, by the processor at the electronic device, the virtual device as the new device.

16. The method of claim 15, wherein the data is transmitted or received between the electronic device and another electronic device in communication with the aggregation device.

17. The method of claim 16, wherein the electronic device and the other electronic device are server nodes.

18. The method of claim 15, wherein the electronic device is a virtualized node or a non-virtualized node.

19. The method of claim 15, further comprising:
enumerating, by the electronic device, a configuration space to determine the new device for use by the electronic device.

20. The method of claim 15, further comprising:
generating, at the electronic device, a request for the virtual device to provide data to a destination via the aggregation device;
intercepting the request at the aggregation device;
copying the data from the electronic device to the aggregation device; and
processing the data by the virtual device at the aggregation device.

21. An apparatus, comprising:
an aggregation device comprising at least one processor that performs operations for:
  a virtual device generator that generates one or more virtual devices for presentation to an electronic device of a plurality of electronic devices in communication with the aggregation device;
  a bus interface module that monitors a communication channel between the electronic device and the aggregation device for addresses intended for transmitting or receiving data between the electronic device and the aggregation device; and
  a data processor that establishes a communication with the generated one or more virtual devices for processing the data between the electronic device and the aggregation device.

22. The apparatus of claim 21, wherein the aggregation device performs operations for a rules engine that processes instructions that establish configuration parameters regarding the use of the virtual devices by the electronic device.

23. The apparatus of claim 22, wherein the rules engine generates a rule from the instructions that establishes that the electronic device identifies a virtual device during an enumeration-related operation.

24. The apparatus of claim 22, wherein the aggregation device performs operations for a management controller that provides the instructions to the rules engine.

25. The apparatus of claim 24, wherein the management controller receives the instructions from a table or other source regarding a number of devices for enumeration and/or other configuration information.

26. The apparatus of claim 24, wherein the management controller includes one or more default configurations, whereby the instructions are provided from the default configurations.

27. The apparatus of claim 24, further comprising a console in communication with the aggregation device for providing the instructions.

28. The apparatus of claim 22, wherein the aggregation device performs operations for a configuration data source that provides the instructions to the rules engine.

29. The apparatus of claim 21, wherein the bus interface module listens for PCIe accesses to a configuration space at the electronic device to determine whether a request is generated for new devices.

30. The apparatus of claim 21, wherein the virtual device generator includes a lookup table that includes a plurality of entries.

31. The apparatus of claim 30, wherein each entry includes a PCIe address and data used by the electronic device to believe a real device is available to it during enumeration.

32. The apparatus of claim 21, further comprising a management console that provides instructions on a number and type of virtual devices that are to be created for use by the electronic device.

33. The apparatus of claim 21, further comprising:
a default configuration that includes instructions on a number and type of virtual devices that are to be created for use by the electronic device.

34. A computer program product, comprising:
a non-transitory computer readable storage medium having computer readable program code embodied therewith, the computer readable program code comprising:
computer readable program code configured to process, at an aggregation device, instructions related to a configuration of an electronic device in communication with the aggregation device;
computer readable program code configured to generate one or more virtual devices in response to processing the instructions;
computer readable program code configured to enumerate, by the electronic device, a configuration space to determine devices for use by the electronic device;
computer readable program code configured to detect, by the aggregation device, an access of the configuration space by the electronic device; and
computer readable program code configured to present, from the aggregation device to the electronic device, the one or more virtual devices in accordance with the instructions.

* * * * *